UNITED STATES PATENT OFFICE.

OTTO H. SCHNEPPER, OF DETROIT, MICHIGAN.

PLASTIC COMPOUND.

SPECIFICATION forming part of Letters Patent No. 647,764, dated April 17, 1900.

Application filed December 16, 1899. Serial No. 740,591. (No specimens.)

*To all whom it may concern:*

Be it known that I, OTTO H. SCHNEPPER, a subject of the Emperor of Germany, residing at Detroit, in the county of Wayne and State of Michigan, have invented certain new and useful Improvements in Plastic Compounds, of which the following is a specification.

The invention relates to an improved solution or wash particularly adapted to be applied to window-panes to give the latter the appearance of stained glass, or the wash may be used as a backing for mirrors, an additional coat of the preparation being applied to the glass when the wash is to be used for this purpose.

In preparing my improved solution I thoroughly mix forty parts of gelatin with forty parts of cold water and heat the same in a double boiler in order to prevent any settling. To this adhesive solution I add a crystallizing material, which will have the effect of making the solution transparent. The crystallizing material is calcium chlorid, and five parts of this are added to and thoroughly stirred into the adhesive solution. Five parts of coloring-matter are then added to the solution while the latter is boiling, and to these ingredients are added ten parts of ether, which is the drying agent of the wash. The solution is then removed from the boiler and strained through a fine sieve or cheese-cloth and is in readiness to be applied to the glass that is to be coated.

What I claim as my invention is—

The herein-described composition of matter consisting of a gelatin solution, calcium chlorid, coloring-matter and ether in the proportions set forth.

In testimony whereof I affix my signature in presence of two witnesses.

OTTO H. SCHNEPPER.

Witnesses:
L. J. WHITTEMORE,
H. C. SMITH.